US006918260B2

(12) United States Patent
Beverly

(10) Patent No.: US 6,918,260 B2
(45) Date of Patent: Jul. 19, 2005

(54) VALVE FOR EVAPORATIVE SYSTEM

(76) Inventor: Rheinhardt J. Beverly, 4150 W. Old Father Pl., Tucson, AZ (US) 85741

( * ) Notice: Subject to any disclaimer, the term of this patent is extended or adjusted under 35 U.S.C. 154(b) by 82 days.

(21) Appl. No.: 10/692,254

(22) Filed: Oct. 23, 2003

(65) Prior Publication Data

US 2005/0086956 A1    Apr. 28, 2005

(51) Int. Cl.[7] .............................................. F28D 3/00
(52) U.S. Cl. .............................. 62/171; 62/91; 62/305
(58) Field of Search ........................... 62/91, 95, 171, 62/305, 310

(56) References Cited

U.S. PATENT DOCUMENTS

| | | | | |
|---|---|---|---|---|
| 5,908,256 A | * | 6/1999 | Bernstein | .................... 401/205 |
| 5,966,953 A | * | 10/1999 | Murr et al. | .................... 62/171 |
| 6,029,467 A | * | 2/2000 | Moratalla | .................... 62/271 |
| 6,557,266 B2 | | 5/2003 | Griffin | |
| 6,574,975 B2 | | 6/2003 | Bourne et al. | |
| 6,575,436 B2 | | 6/2003 | Litz | |
| 6,581,855 B1 | | 6/2003 | Cook | |
| 6,591,630 B2 | | 7/2003 | Smith et al. | |
| 6,598,414 B1 | * | 7/2003 | Cline | .......................... 62/314 |
| 6,601,404 B1 | | 8/2003 | Roderick | |

* cited by examiner

Primary Examiner—Melvin Jones
(74) Attorney, Agent, or Firm—Mark Ogram

(57) ABSTRACT

A cooling system which utilizes a movable frame positioned within a duct. The moveable frame has an evaporative pad and where a nozzle is positioned to spray water onto the evaporative pad such that the weight of the water causes the frame to move to a lower position, thereby shutting-off the water flowing to the nozzle. As the water in the evaporative pad evaporates, the frame shifts to an upper position where the water is again sent through the nozzle to the evaporative pad, and the cycle repeats itself.

15 Claims, 4 Drawing Sheets

VALVE FOR EVAPORATIVE SYSTEM

BACKGROUND OF THE INVENTION

This invention relates generally to evaporative cooling systems and more particularly to water valves used in such systems.

The true beginning of evaporative coolers is not known. It is known that cooling towers, where evaporating water causes the cool air to settle through the tower, have been used for a millennium or more.

In a cool tower, a collection of evaporative pads are soaked using a constantly flowing stream of water. As the water evaporates, the air is cooled and tends to settle. The falling cool air pulls more air through the water soaked pads, thereby creating a cooling cycle with a flow of chilled air.

A major problem associated with cool towers is the use and control of a constantly flowing water stream. The stream of water is ideally balanced to the evaporative rate, but, this is impossible due to the ever changing ambient conditions; therefore, the pads are either too dry or drip the excess water.

Modern evaporative cooling systems are extremely effective where the ambient air is relatively dry and where there is a good source of water and electricity. In a typical situation, water is pumped onto evaporative pads and an electric fan pulls air through the pads (where the ambient air is cooled) and then is forced into the house.

A catch basin is used to collect the excess water and a pump is used to re-cycle the water over the evaporative pads.

In the case where there isn't any electricity though, a traditional evaporative cooling system does not work.

It is clear that there is a need for an evaporative cooling system where electricity is not readily available.

SUMMARY OF THE INVENTION

The invention creates a cooling system which utilizes a movable frame ideally positioned within a duct. While the current discussion utilizes the present invention within a duct, the invention is not so limited and may be used in a variety of locations including, but limited to, attics where the attic air is to be cooled using evaporation.

Within the invention, the moveable frame has an evaporative pad. The evaporative pad is any of those well known in the art. The evaporative pad is configured to absorb water and allow a flow of air to pass through the pad, thereby allowing the water within the pad to evaporate. In the preferred embodiment, the evaporative pad is placed in a horizontal position.

A nozzle is positioned to spray water onto the evaporative pad. In some embodiments, the nozzle is secured to the frame and moves with the movement of the frame/evaporative pad. In other embodiments, the nozzle is positioned to address the evaporative pad when the frame is in an upper position.

As the nozzle sprays water onto the evaporative pad, the evaporative pad absorbs the water and the weight of the water causes the frame to move to a lower position. This movement of the frame causes a valve to shut off the water flowing to the nozzle.

The valve is secured at a location separate from the frame/evaporative pad so that there is relative movement between the valve and the frame. A rod or other such mechanism connects the frame to the valve and the relative movement between the frame and valve is communicated by the rod so that the valve's operation is controlled thereby.

Once the frame/evaporative pad is in the lower position and water is no longer being applied via the nozzle, water within the evaporative pad evaporates; thereby reducing the weight of the frame. The frame rises to an upper position; thereby forcing the valve to open and water is again sent through the nozzle to the evaporative pad; the cycle repeats itself.

The invention, together with various embodiments thereof, will be more clearly explained by the accompanying drawings and the following description thereof.

DRAWINGS IN BRIEF

DRAWINGS IN DETAIL

Figures 1A, 1B:
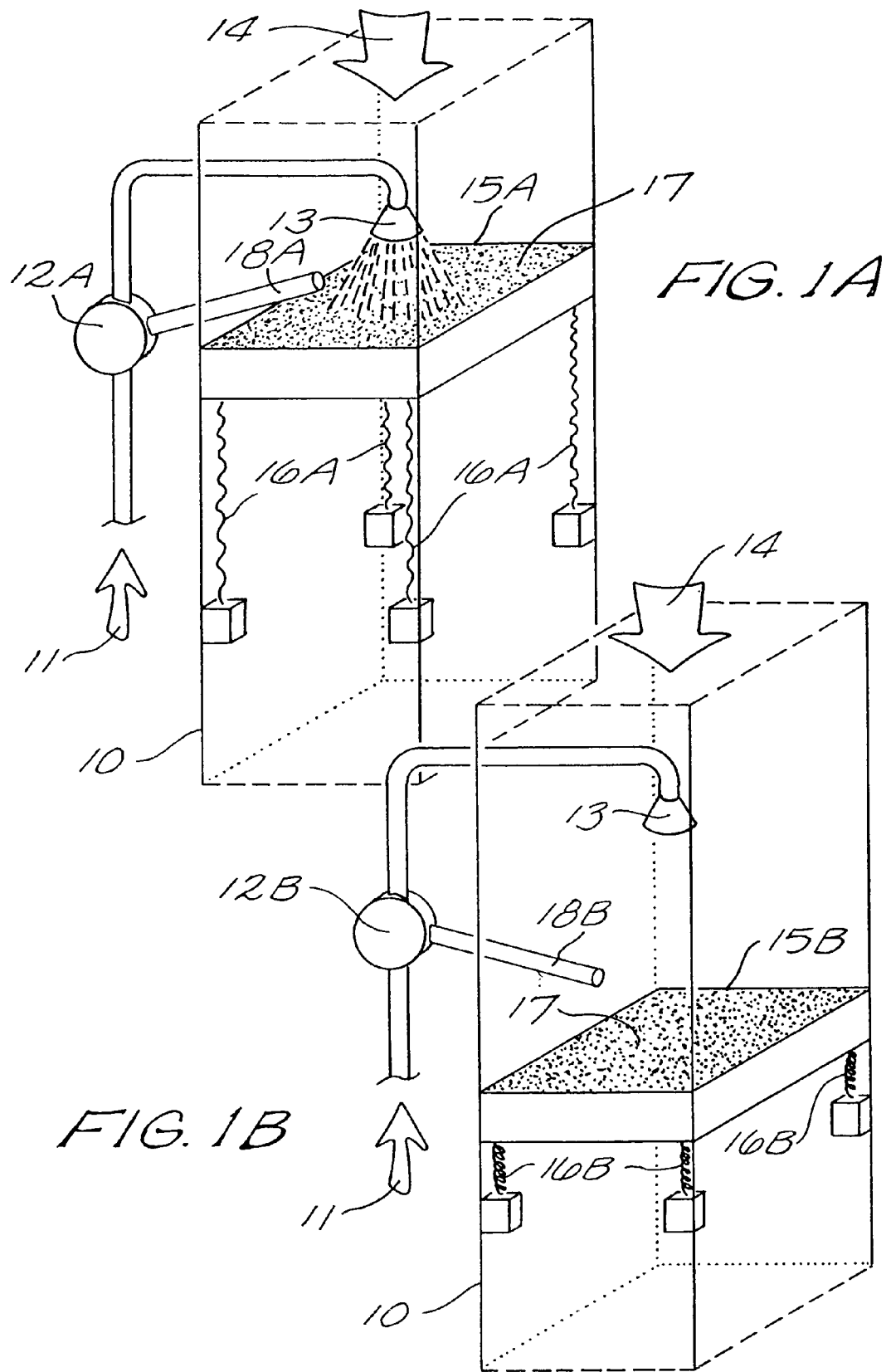
FIGS. 1A and 1B show the preferred embodiment in two different states: water valve open; and, water valve closed.

FIGS. 1A and 1B show the preferred embodiment in two different states: water valve open; and, water valve closed.

FIG. 1A illustrates the state where water valve 12A is open allowing water 11 to flow through nozzle 13. Water valve 12A is operated by lever 18A, shown in a raised position in FIG. 1A. Lever 18A is normally held in a closed position by being spring loaded (not shown). Lever 18A is moved to the "open" position by frame 15A, as frame 15A is forced upwards within duct 10 by springs 16A.

As the water is sprayed by nozzle 13 onto absorbent material 17, two reactions occur. The first is the cooling of the air surrounding the moistened absorbent material 17; as the air cools, it falls pulling more ambient air 14 into the duct.

The second reaction that occurs is the creation of more weight (from the water) on frame 15A, thereby causing springs 16A to be compressed to that shown as springs 16B of FIG. 1B; thereby lowering frame 15A to the state shown in FIG. 1B.

As shown in FIG. 1B, when frame 15B is in its lowest position, lever arm 18B closes water valve 12B so that no water is emitted from nozzle 13. With the absorbent material still moistened, the cooling process continues on ambient air 14. When sufficient water has been evaporated, thereby reducing the weight within frame 15B, frame 15B starts to rise to the state shown by frame 15A of FIG. 1A, so that the water valve 12A is opened again to repeat the cycle.

In this manner, the pads are kept wet without the use of any electrical pumps.

Figure 2A:
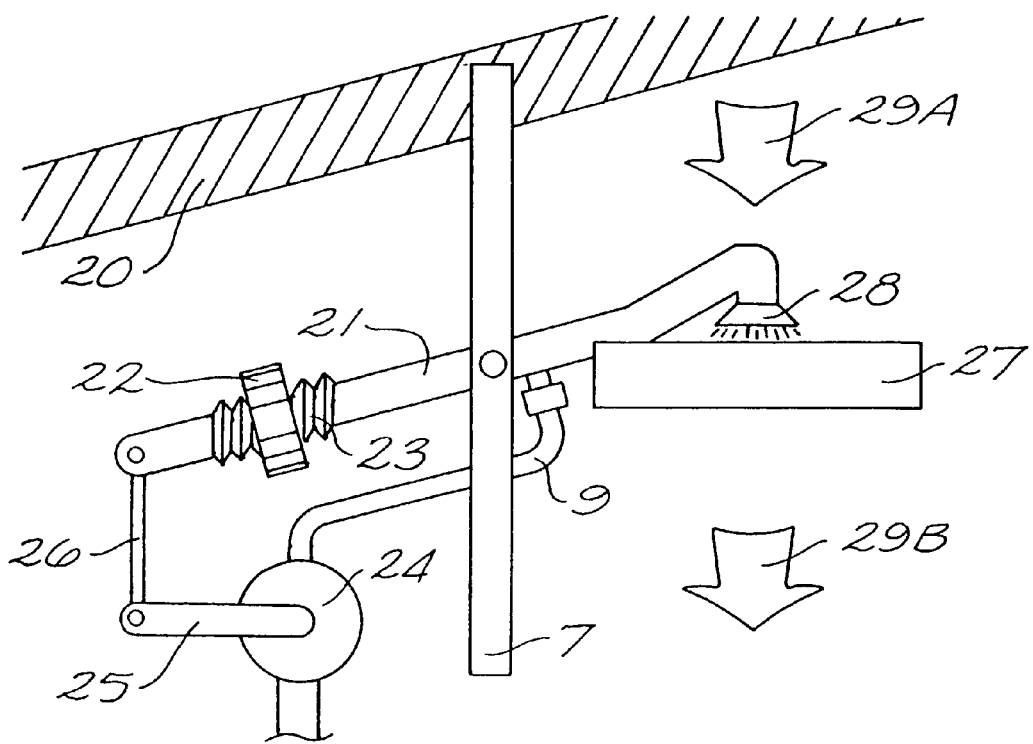
FIGS. 2A and 2B illustrate an alternative embodiment of the invention showing the use of a weighted arm used to adjust movement of the absorption pad.
Figure 2B:
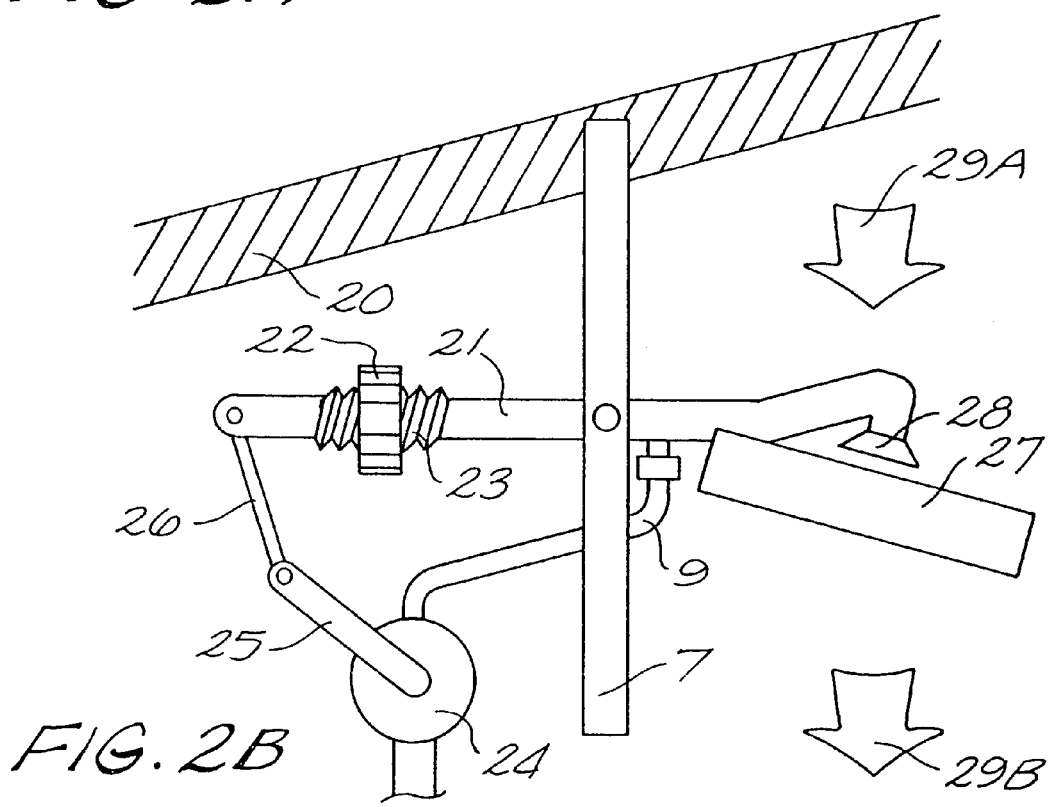

FIGS. 2A and 2B illustrate an alternative embodiment of the invention showing the use of a weighted arm used to adjust the movement of the absorption pad.

In this embodiment, support 21 is pivotally secured to pivot arm 7 which in turn is secured to attic rafter 20. This arrangement assures that pivot arm 7 and rafter 20 remain in a fixed position leaving support 21 to rotate thereupon.

Frame 27, containing the absorbent material, is secured to one end of support 21. On the opposing end of support 21 is adjustment weight 22 which is moved on threads 23 so that a proper "balance" is obtained.

In this context, a "balance" is when support 21 is in the position shown in FIG. 2A when the absorbent material within frame 27 is substantially dry; and is in the position shown in FIG. 2B when the absorbent material is properly moistened.

The application of water when support is in the position shown in FIG. 2A is through the movement of valve arm 25 which is connected via connecting rod 26 to the end of support 21. In this manner, when support 21 is in the position shown in FIG. 2A, valve arm 25 in pressed downward, thereby opening water valve 24 permit the water to flow through flexible tubing 9 to nozzle 28, thereby dispenses water onto the absorbent material within frame 27.

Ambient air 29A is drawn through (through the cooling of the air) the absorbent material to exit as cooled air.

When the absorbent material is sufficient moistened, support 21 moves to the position shown in FIG. 2B. Connecting rod 26 pulls valve arm 25 upward to shut off valve 24, thereby denying any further water to frame 27 and its attendant absorbent material.

Ambient air 29A continues to be drawn through frame 27, thereby drying the absorbent material and reducing its overall weight. When the absorbent material is sufficient dry, support 21 again moves from the position shown in FIG. 2B to that shown in FIG. 2A and the water valve 24 is again opened.

In this manner, the absorbent material within frame 27 is continuously moistened to permit the evaporative cooling of the attic region of the house.

Figure 3A:
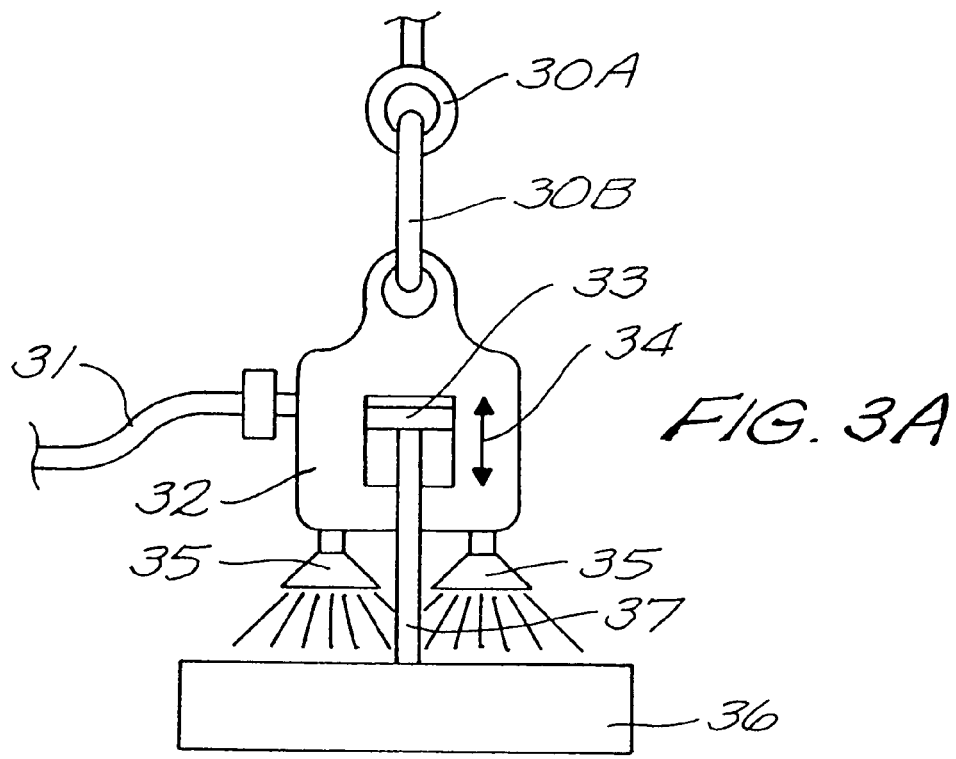
FIGS. 3A and 3B are front and side views of an embodiment of the invention in which the valve also serves as a support for the absorbent pad.
Figure 3B:
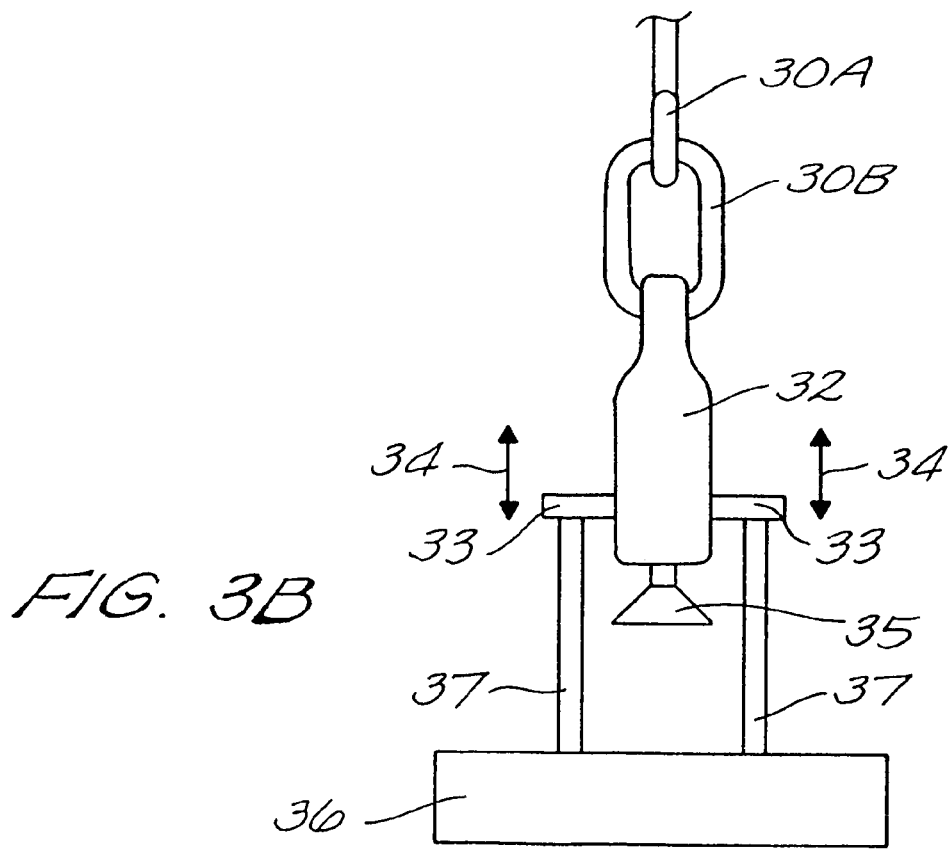

FIGS. 3A and 3B are front and side views of an embodiment of the invention in which the valve also serves as a support for the absorbent pad.

Water valve 32 is supported by loop 30B which is secured to eye bolt 30A. Eye bolt 30A is screwed into a beam (not shown). Hose 31 supplies water to water valve 32.

Slide mechanism 33 moves in an upward/downward motion indicated by arrows 34. Springs (not shown, enclosed within valve 32) provides tension to keep slide 33 in an upward condition. In the upward condition, valve 32 is "open", allowing water to flow through nozzles 35 which emit water onto frame 36 with absorbent pads.

As the absorbent pads become heavier, due to the water being deposited, slide 33 moves into the downward position and the water flow is stopped.

As before, when the water evaporates sufficiently from the absorbent pads, the slide mechanism returns to the upward condition so that the cycle is able to repeat.

Figure 4:
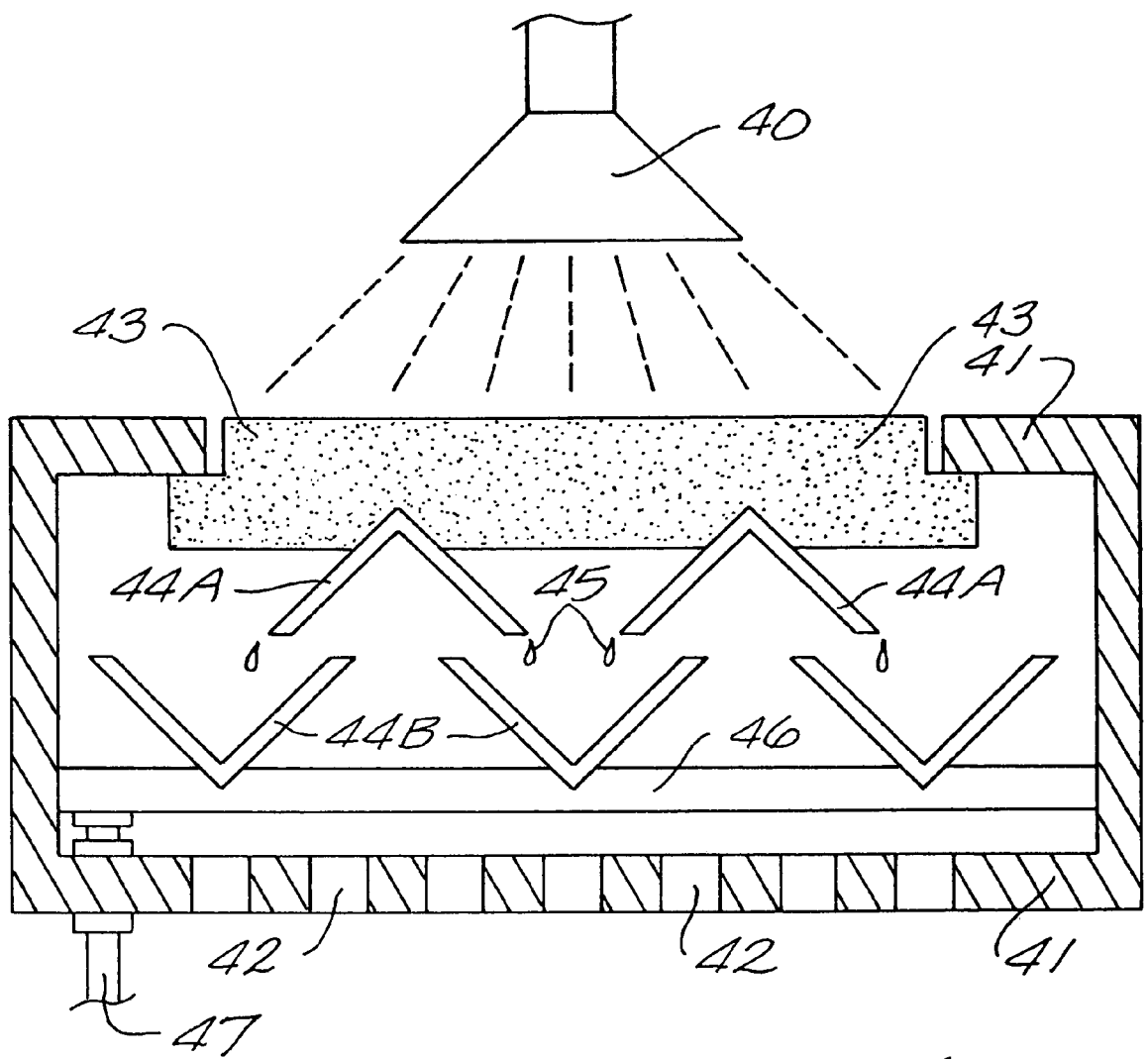
FIG. 4 illustrates the preferred embodiment of the frame and absorbent material illustrating the "leak proof" properties of the preferred frame.

FIG. 4 illustrates the preferred embodiment of the frame and absorbent material illustrating the "leak proof" properties of the frame.

Frame 41 holds absorbent material 43 such that water from nozzle 40 is directed thereto. Baffles 44A and 44B are used to direct excess water 45 to collection tank 46 which passes the collected water through to waste water 47.

The cooled air is able to easily pass between baffles 44a and 44B and then exit the bottom of frame 41 via openings 42.

It is clear the present invention creates a highly improved and versatile evaporative cooling mechanism.

What is claimed is:

1. A cooling system comprising:
   a) a movable frame having an evaporative pad secured thereto, said movable frame having an upper position and a lower position;
   b) a nozzle positioned to deposit water onto said evaporative pad;
   c) a misting valve controlling the application of water through said nozzle, said misting valve being controlled by said movable frame such that:
      1) when said movable frame is in the upper position, water passes through said misting valve to said nozzle, and,
      2) when said moveable frame is in the lower position, water is not permitted to pass through said misting valve to said nozzle.

2. The cooling system according to claim 1, wherein said movable frame moves to the lower position when said evaporative pad is substantially saturated with water.

3. The cooling system according to claim 2,
   a) further including an air channel configured to communicate air into a dwelling; and,
   b) wherein said movable frame is contained within said air channel such that air passes through said evaporative pad before entering said dwelling.

4. The cooling system according to claim 3, further including adjustment means for operator definition of a weight required to move said movable frame from said upper position to said lower position.

5. The cooling system according to claim 3, further including a drip pan positioned to collect liquid water from said evaporative pad.

6. The cooling system according claim 2, further including means for suspending said moveable frame within an attic of a dwelling.

7. The cooling system according to claim 6, wherein said nozzle is secured to said means for suspending.

8. A cooling system comprising:
   a) a movable evaporative pad having an upper position and a lower position;
   b) a nozzle positioned to deposit water onto said evaporative pad only when said evaporative pad is in the upper position; and,
   c) a misting valve controlling the application of water through said nozzle such that:
      1) when said evaporative pad is in the upper position, water passes through said misting valve to said nozzle, and,
      2) when said evaporative pad is in the lower position, water is not permitted to pass through said misting valve to said nozzle.

9. The cooling system according to claim 8, further including adjustment means for defining a weight required to move said movable frame from said upper position to said lower position.

10. The cooling system according to claim 9, further including a drip pan positioned to collect liquid water from said evaporative pad.

11. The cooling system according to claim 10, further including means for suspending said evaporative pad within an attic of a dwelling.

12. The cooling system according to claim 11, wherein said nozzle is secured to said means for suspending.

13. A cooling system comprising:
   a) a duct communicating ambient air to an interior of a dwelling;
   b) a movable frame positioned within said duct, said moveable frame having an evaporative pad secured thereto, said movable frame having an upper position and a lower position within said duct;
   c) a nozzle positioned to deposit water onto said evaporative pad such that weight of said water causes said frame to move to the lower position;

d) a misting valve controlling the application of water through said nozzle, said misting valve being controlled by said movable frame such that:
   1) when said movable frame is in the upper position, water passes through said misting valve to said nozzle, and,
   2) when said moveable frame is in the lower position, water is not permitted to pass through said misting valve to said nozzle.

14. The cooling system according to claim 13, further including adjustment means for operator definition of a weight required to move said movable frame from said upper position to said lower position.

15. The cooling system according to claim 14, further including a drip pan positioned to collect liquid water from said evaporative pad.

* * * * *